June 24, 1969 R. A. SIMON 3,451,798
SHEET GLASS EDGE CONTROL DEVICE

Filed April 4, 1966 Sheet 1 of 2

INVENTOR.
Raphael A. Simon
BY
ATTORNEY

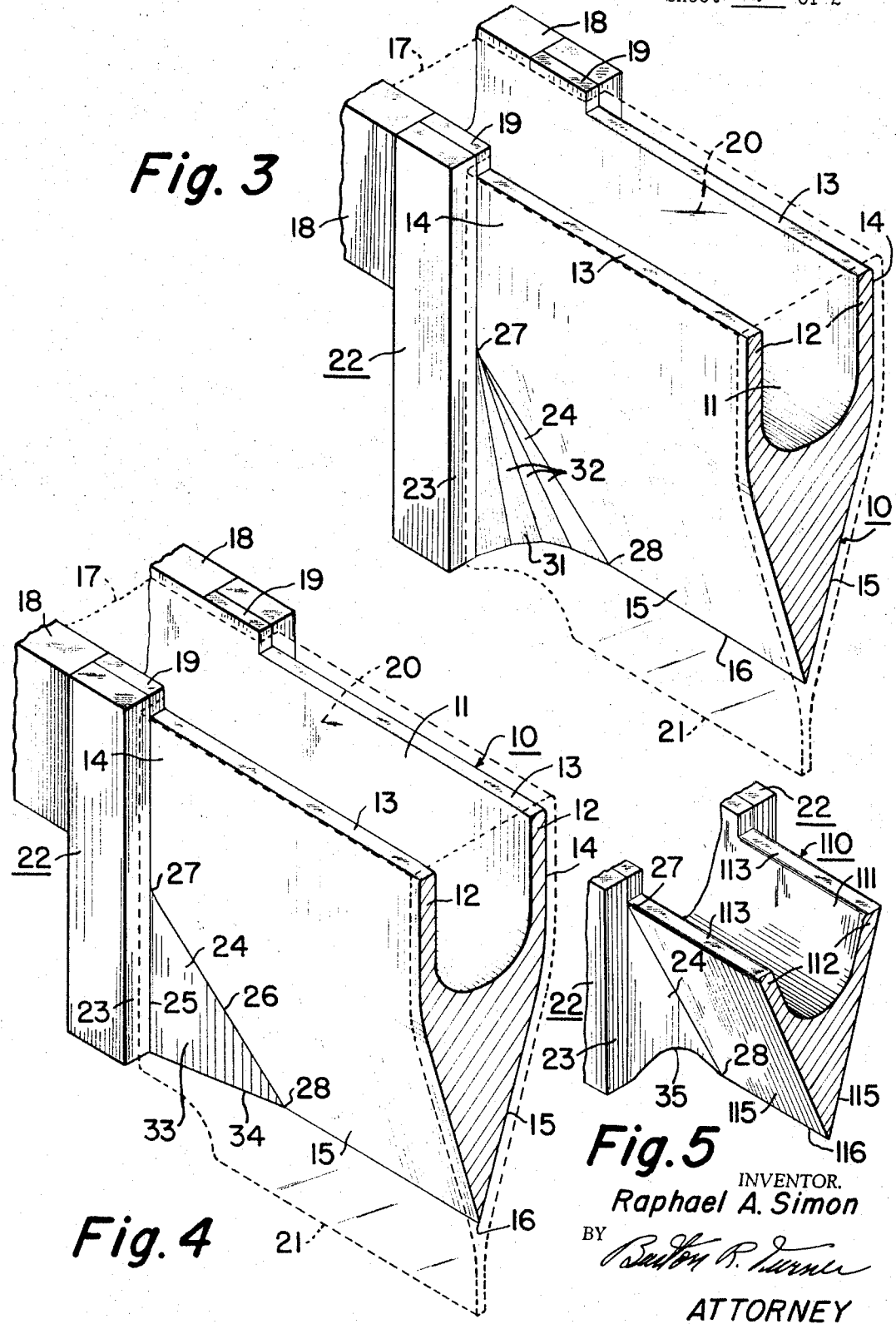

United States Patent Office 3,451,798
Patented June 24, 1969

3,451,798
SHEET GLASS EDGE CONTROL DEVICE
Raphael A. Simon, Corning, N.Y., assignor to Corning Glass Works, Corning, N.Y., a corporation of New York
Filed Apr. 4, 1966, Ser. No. 539,903
Int. Cl. C03b 17/00
U.S. Cl. 65—199
14 Claims

ABSTRACT OF THE DISCLOSURE

In the overflow-downdraw process of forming sheet glass, maximum usable width and thickness uniformity are obtained by providing an edge attachment surface for the downwardly flowing glass while thinning edge portions thereof.

---

This invention relates to the formation of sheet glass by the overflow-downdraw process, and more particularly to a method of and means for maximizing the width of usable glass sheet of uniform thickness while simultaneously controlling glass flow to minimize the inherent formation of edge bead.

The manufacture of sheet glass by downwardly flowing molten glass over a forming wedge is well known in the art. However, in practice it was found that the actual width of usable sheet produced was substantially less than the maximum width of usable glass sheet which theoretically could be obtained, as predicted by the longitudinal length of the forming wedge. That is, it has been found that when the molten glass flows along the underside of an inclined surface, such as the downwardly converging surfaces of the forming wedge, the width of the glass stream contracts and pulls inwardly from the vertical ends of the forming wedge.

The lateral movement of the molten glass, as it flows along the converging forming surfaces, produces a bead or thickening portion along the edge of the sheet which decreasingly extends inwardly from the edge toward the center thereof. The thickened sections on the edges of the sheet not only decreases the amount of usable uniform thickness sheet glass that can be obtained from a given width of drawn sheet, but also limit the speed at which the sheet may be drawn to a fraction of that which sheet of uniform thickness can be drawn. That is, since the sheet is annealed as a continuous process immediately after formation, and the time required for sheet glass to reach an acceptable strain level in passing through the annealing portion of the process is directly proportional to the thickness of the glass, sheet having thickened edge portions requires more annealing time, thus limiting the maximum rate of sheet formation.

In the past it has been suggested that the narrowing of the width of glass sheet formed by the downdraw process may be prevented by edge rolling or cooling. However, this has not been entirely satisfactory since rolling merely attempts to reduce the thickness of the beaded portion without attempting to correct the cause or source of the bead, and cooling tends to enlarge the formation of beaded edges, which as previously indicated are detrimental in the formation of sheet glass. Further, I have found that high viscosities adjacent the edges of the sheet flow actually tend to create a pull-in or narrowing more than low viscosities. However, if the edges are chilled sufficiently to set up the glass, additional detrimental effects are produced in the form of sheet warpage and stresses.

The present invention virtually obviates the problems of reduction in sheet width and bead formation heretofore encountered in downdraw forming of sheet glass by providing edge director projections on the outside surfaces of the forming wedge. These edge directors cause edge portions of the molten glass stream or ribbon flowing downwardly along the forming wedge to continue to flow in a substantially vertical plane along the longitudinal ends of the forming wedge downwardly to the bottom edge of such wedge. Each edge director has a projecting edge surface portion which extends along edge portions of the forming wedge, and a web or filleted portion which extends between such projecting edge surface portion and an adjacent downwardly forming surface. The molten glass flowing adjacent the vertical edge of the forming wedge flows along the web surface and maintains a substantially vertical line of flow which may extend down to the elevation of the apex or root of the forming wedge. The web surface of the edge director projections a wetted length in the horizontal direction which is greater than the horizontal length of the wedge surface which it intercepts, and accordingly spreads out the flowing glass and decreases its thickness adjacent its ends before the glass is drawn off the lower edge thereof.

It thus has been an object of the present invention to eliminate the problems of narrowing and edge beading heretofore encountered in the downdraw manufacture of sheet glass.

A further object of the invention has been to minimize the formation of beaded edges in downdrawn sheet glass so as to maximize the speed at which the sheet may be drawn.

A further object of the invention has been to increase the yield of uniform thickness sheet glass produced by the downdraw process, by providing edge director projections on the outside surface of the forming wedge to maintain sheet uniformity.

These and other objects of the invention will become more apparent to those skilled in the art from the following disclosure and accompanying drawings in which:

FIGURES 2, 3 and 4 are fragmental perspective views ilustrating various embodiments of edge director projections positioned on a single-end feed overflow trough or forming wedge, of the type shown in FIGURE 1.

FIGURE 5 is a fragmental perspective view of a further embodiment of edge director projections positioned upon a V-shaped overflow trough or forming wedge.

Figure 1:
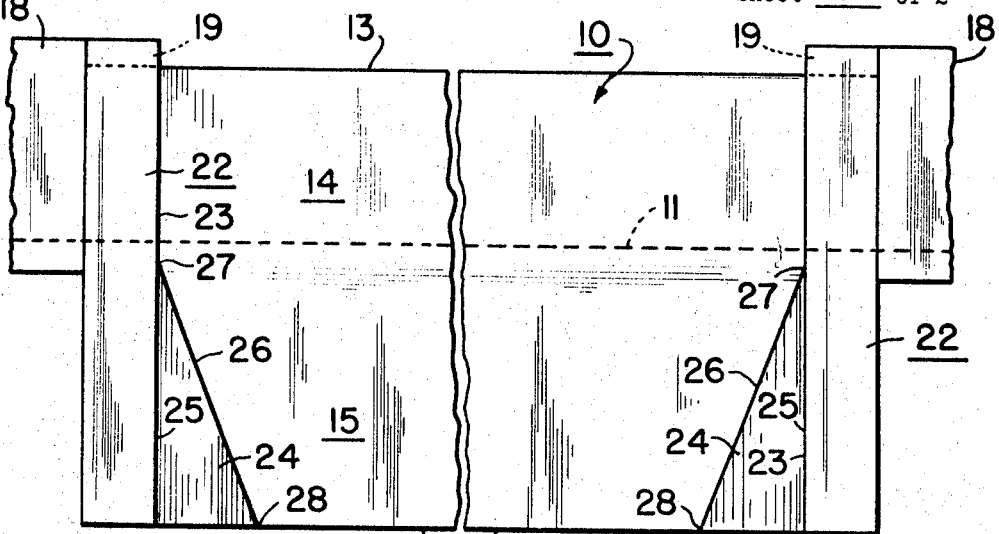
FIGURE 1 is a front elevational view of a forming wedge provided with edge director projections embodying the present invention.

Referring now to the drawings, and particularly FIGURES 1 through 4, an overflow trough member or forming wedge 10 is shown having an upwardly open channel 11 bounded on its longitudinal sides by wall portions 12, which terminate at their upper extent in opposed longitudinally-extending overflow weirs or lips 13. The weirs or lips 13 communicate with oposed outer sheet forming surfaces of the wedge member 10. As shown, the wedge member illustrated in FIGURES 1 through 4 is provided with a pair of substantially vertical forming surface portions 14 which communicate with the lips 13, and a pair of downwardly inclined converging surface portions 15 which terminate at a substantially horizontal lower apex or root 16 forming a glass draw line.

Molten glass 17 is fed into the channel 11 by means of a delivery passage 18 communicating with the channel 11. The feed into channel 11 may be single ended or, if desired, double ended as shown in FIGURE 1. A pair of restricting dams 19 are provided above the overflow lips 13 adjacent each end of the channel 11 to direct the overflow of the free surface 20 of the molten glass 17 over the overflow lips 13 as separate streams, and down the opposed forming surface portions 14, 15 to the apex 16 where the separate streams, shown in chain lines, converge to form a sheet of virgin-surfaced glass 21.

As shown in FIGURE 1, a pair of edge directors or correctors 22 are provided on each side of the forming wedge 10 so that one extends along the vertical extent of each longitudinal edge of the wedge. Accordingly, four edge directors are provided for each forming wedge, with one at each vertical corner so that two such edge directors are oppositely disposed at each longitudinal end of the forming wedge. The edge directors 22 are composed of two main portions including a projecting edge surface portion 23 which intersects the forming surface portions of the wedge along their vertical extent, and a web surface portion 24 which extends between the projecting edge surface portion 23 and one of said downwardly inclined converging surface portions 15.

The web surface portion 24 intersects the edge surface portion 23 along an intersection line 25, and also intersects the inclined forming surfaces portion 15 along an intersection line 26. The intersection of web or filleted portion 24 with both such surfaces is preferably smoothly rounded or tangential to insure glass-to-surface contact and avoid air pockets and streaking. In addition, the intersection 26 extends from a point 27 where the top of the downwardly inclined forming surface intersects the projecting edge surface portion 23, diagonally downwardly to a point 28 along the root or apex of the forming wedge which is spaced inwardly from the projecting edge surface portion. In view of the fact that each of the four edge directors utilized with a particular forming wedge will be identical, only one such edge director will be described with regard to each embodiment thereof.

Figure 2:
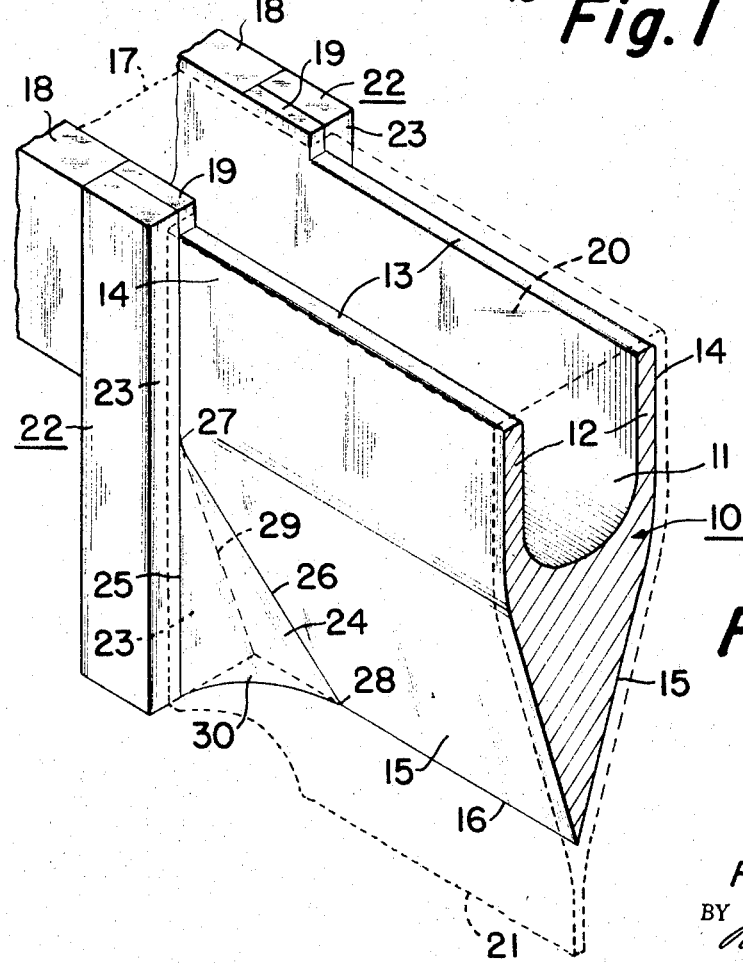

Referring now to FIGURE 2, an edge director 22 is shown having a projecting edge surface portion 23 which extends the full height of the forming wedge in a vertical plane which intersects the longitudinal planes of the forming surfaces 14 and 15 at right angles. However, it is to be understood that if the desired plane of projecting edge surface portion 23 may be slightly inclined to the vertical and/or askew to the forming surface portions. The web or filleted portion 24 is shown overlying an intersection 29 between the projecting edge portion 23 and inclined forming surface 15. The web portion 24 is provided with a curvilinear surface portion 30 which tangentially intersects the projecting edge surface portion 23 along line 25, and tangentially intersects the downwardly inclined forming surface 15 along diagonal line 26. The curvilinear portion 30 is, in effect, an oblique conical surface which terminates at its lower end in the same horizontal plane as the apex 16 and lower end of edge surface 23.

Referring now to FIGURE 3, an edge director 22 having a projectig edge surface portion 23, similar to that shown in FIGURE 2, is provided with a web portion 24 having a multi-planar surface portion 31. As shown, the multi-planar surface portion is composed of a plurality of intersecting planar triangular portions 32 which extend from an upper apex point 27, at the intersection of the top of inclined forming surface 15 and projecting edge surface portion 23, downwardly to the horizontal plane of the root or apex 16 and lower edge of surface 23.

FIGURE 4 illustrates a further embodiment of an edge director 22 having a projecting edge surface portion 23 similar to that shown in FIGURE 2, but having a lower edge which terminates at an elevation above the horizontal plane passing through the apex 16 of the forming wedge 10. A web member 24 is shown having a planar surface portion 33, vertically intersecting the projecting edge surface 23 along line 25, and diagonally intersecting inclined forming surface 15 along line 26. If desired, the edges of the planar surface portion 33 may be contoured to provide a tangential intersection along lines 25 and 26. The lower edge 34 of planar surface portion 33 extends obliquely upwardly from the horizontal plane passing through the apex 16, so as to facilitate the positionment of edge drawing rollers immediately beneath the forming wedge 10.

FIGURE 5 illustrates a further embodiment of edge directors 22 applied to a V-shaped overflow trough or forming wedge 110. The forming wedge 110 is similar to the forming wedge 10 in that it has an upwardly open channel 111 bounded by sidewall portions 112 having overflow lips 113 at their upper edges, however, a pair of opposed downwardly inclined converging forming surfaces 115 extend from a lower apex 116 at the root of the wedge 110 up to the overflow lips 113. Therefore the web portion 24 of the edge director 22 not only extends the full height of the opposed downwardly inclined converging forming surfaces, as in the embodiments shown in FIGURE 1 through 4, but also extends the full height of the forming wedge itself, since the wedge is V-shaped and does not include vertical forming surface portions. However, as in the embodiments shown in FIGURES 1 through 4, the web 24 extends from a point 27, at the intersection of the top of the inclined forming surface with the projecting edge surface portion 23, downwardly to the root or bottom apex of the forming wedge. If desired, the bottom edge 35 of the web portion 24 may be provided with a vertically-extending arcuate curvature, extending upwardly from its intersection 28 with the apex of the forming wedge, so as to provide a varying degree of edge flow control.

Although various edge directors with different embodiments of the web portion are shown with respect to particular wedge configurations, it should be understood that all of the various web embodiments may be utilized with virtually any of the known wedge configurations. In addition, it is within the scope of the invention to provide any of the disclosed surface configurations of web 24 with either a straight horizontal bottom edge, an inclined oblique bottom edge, or a vertically curvilinear bottom edge as shown in the various embodiments. The edge directors may be formed from cast refractory or suitable refractory metal compositions, such as stainless steel, platinum, platinum-rhodium alloys, or other high temperature alloys. When made of metal, the web portion 24 may be backed with a suitable refractory if desired.

The various embodiments of the edge directors all operate on virtually the same principle to produce a maximum width glass sheet having a minimum amount of edge bead. The edge directors provide an attachment projecting edge surface for the edge portions of the molten glass flowing along the forming wedge, and a web portion 24 for maintaining a flow of the molten glass adjacent such edge surface portion. The diagonal intersection between the web surface portion and the inclined forming surface portion should be smoothly rounded so as to avoid the formation of an air pocket along such juncture due to the pulling away of the molten glass from the forming surface. A tangential intersection between the web surface portion and the inclined plane of the forming surface on the undersurface of the forming wedge insures the desired molten glass-to-surface contact along the intersection of the web with the inclined forming surface.

Molten glass flowing downwardly along edge portions of the converging forming surfaces is intercepted by the web surfaces along their diagonal lines of intersection with the inclined forming surfaces. Edge portions of the downwardly flowing sheet are first guidably supported by the inclined forming surfaces, and then by the web surface portions 24 of the edge director 22. The web portions function to maintain a full-width and substantially vertical flow down to the elevation of the bottom edge of the web portion, thus tending to separate the edge flows along opposed web portions as central portions continue to converge along the inclined forming surfaces.

The contour of the web surface portion provides a wetted length, which in a horizontal direction is greater than the length of the forming surface which it intercepts, and accordingly spread out or thins the glass flowing thereover, thus actually decreasing the thickness of the longitudinal edges of the molten glass stream before it leaves the bottom edge of the web portion. As the molten glass flows off the bottom edge of the separate opposed web portions, the inherent drawing tension effect which normally decreases sheet width and thickens the edges, now brings the thickness of such free flows back to their normal value as they unite below the root or glass drawing line of the wedge. Accordingly, edge bead is virtually eliminated, while maximum sheet width of uniform thickness is obtained.

Although I have disclosed the now preferred embodiments of the invention, it will become apparent to those skilled in the art that various changes and modifications may be made thereto without departing from the spirit and scope thereof as defined in the appended claims.

I claim:

1. Apparatus for downwardly drawing sheet glass which comprises, a forming wedge having a pair of downwardly inclined forming surface portions for flowing molten glass therealong, edge director means extending along vertical edge portions of said forming surfaces, and said edge director means having web means communicating with said forming surfaces for intercepting and thinning the flow of glass along edge portions of such forming surfaces.

2. Apparatus as defined in claim 1 wherein each said edge director means includes an edge surface projecting from one of said forming surfaces, and said web means communicates tangentially with both said edge surface and said forming surface.

3. Apparatus as defined in claim 1 wherein the bottom edge of said web means is obliquely inclined with respect to a bottom edge of said forming surface.

4. Apparatus as defined in claim 1 wherein said web means is provided with a curvilinear surface.

5. Apparatus as defined in claim 1 wherein said web means is provided with a planar surface portion.

6. Aparatus as defined in claim 1 wherein said web means is provided with a multi-planar surface.

7. In apparatus for downdrawing sheet glass over a forming wedge having a pair of downwardly inclined converging forming surface portions, the improvement for maintaining thickness uniformity comprising, edge director means extending along the vertical extent of edge portions of said forming wedge; each said edge director means having a propjecting edge surface portion extending outwardly from a forming surface of said forming wedge, and a web surface portion communicating between said projecting edge surface portion and a downwardly inclined forming surface portion; and said web portion intersecting said downwardly inclined forming surface portion along a diagonal line extending the full height of said inclined forming surface portion.

8. Apparatus as defined in claim 7 wherein said web portion extends from a point at the intersection of said projecting edge surface portion with the top of said inclined forming surface portion downwardly along said projecting edge surface portion to the bottom of said edge director means, and also from said point diagonally downwardly along said inclined forming surface portion to a point on the bottom edge of such surface which is spaced-apart from said projecting edge surface portion.

9. Apparatus as defined in claim 7 wherein the lower edge of said projecting edge surface portion terminates in an elevation above the lower edge of said inclined forming surface, and the lower edge of said web portion is inclined to extend between such edge portions.

10. Apparatus as defined in claim 7 wherein said web portion is provided with a vertically curvilinear bottom edge.

11. Apparatus as defined in claim 7 wherein said web portion tangentially communicates with both said projecting edge surface portion and said downwardly inclined forming surface portion.

12. Apparatus as defined in claim 7 wherein said web portion is provided with a curvilinear surface.

13. Apparatus as defined in claim 7 wherein said web portion has a multi-planar surface.

14. Apparatus as defined in claim 7 wherein said web portion is provided with a planar surface.

References Cited

UNITED STATES PATENTS 1,891,371  11/1932  Danner _____ 65—195

S. LEON BASHORE, *Primary Examiner.*

J. H. HARMAN, *Assistant Examiner.*

U.S. Cl. X.R.

65—90, 121, 193, 324